June 3, 1947.     G. A. LYON     2,421,384
ORNAMENTAL COVER FOR VEHICLE WHEELS
Filed Dec. 6, 1943
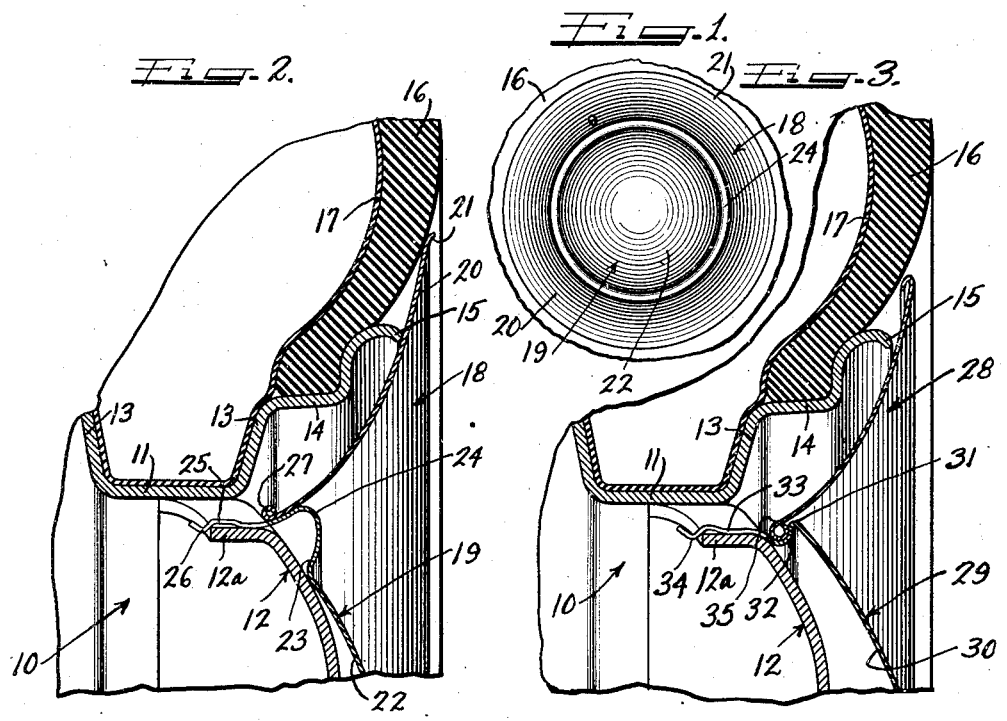
Inventor
GEORGE ALBERT LYON.
by Charles H. Hill
Attys.

Patented June 3, 1947

2,421,384

UNITED STATES PATENT OFFICE 2,421,384

ORNAMENTAL COVER FOR VEHICLE WHEELS

George Albert Lyon, Allenhurst, N. J.

Application December 6, 1943, Serial No. 513,031

1 Claim. (Cl. 301—37)

This invention relates to an improved wheel structure and is directed more particularly to an improved cover assembly therefor.

It is an important object of the present invention to provide for disposition over the outer side of a wheel structure a cover assembly including an outer annular part formed from sheet synthetic plastic material or the like, having characteristics enabling it to be resiliently, locally, temporarily flexed and yet enabling it to be self-sustaining as to form and to immediately snap back into initial configuration when distorting pressures are relieved therefrom and a central circular hub cap simulating cover portion formed from more rigid material such as thin sheet steel or the like, this central portion being provided with means for detachably engaging the wheel structure and with further means for retainingly engaging the outer plastic cover member so that the cover assembly may be removably maintained upon the wheel structure as a unitary assembly.

It is still another object of the invention to provide for disposition over the outer side of a wheel structure, a cover assembly including an outer annular sheet synthetic plastic cover member and a central circular hub cap simulating member, the latter being formed to retainingly receive and rigidify and reinforce the outer cover member and having means arranged for detachable engagement with the wheel structure.

It is a further object of the invention to provide for disposition over a wheel structure, a cover assembly including an outer annular resiliently, temporarily, locally flexible portion formed from sheet synthetic plastic material or the like, said annular portion having a cross-sectional configuration of such shape and expanse that it extends entirely over the tire rim of a wheel structure and radially outwardly beyond the same into adjacency with the side wall of a tire therein and radially inwardly to a point beyond the junction of the tire rim and a central load bearing portion thereof and having a cross-sectional shape so as to generally simulate the shape of the side wall of a tire in the tire rim to give the appearance of being a continuation thereof and to give the appearance of being a white side wall on a massive tire, when colored white, the cover assembly also including a central circular hub cap simulating member having means thereon for detachably engaging with a portion of the wheel and also having an intermediate circular part cross-sectionally configurated to provide a radially outwardly extending ribbed part behind which the radially inner margin of the annular cover may extend to afford a unitary, multi-part cover assembly, the junction between the cover parts affording lateral movement of the radially outer portions of the annular cover member to accommodate expansion of the side wall of the tire under load bearing conditions without the imposition of undue, localized stresses and strains of any part of the annular cover member when so flexed.

In accordance with the general features of one form of the invention shown herein there is provided a cover member for disposition over the outer side of a wheel structure having wheel openings circumferentially spaced along the junction of a tire rim and a central load bearing portion thereof, said cover assembly including an outer annular portion formed from resiliently, locally, temporarily flexible material and extending radially outwardly beyond the edge portion of the tire rim into adjacency with the side wall of the tire, there being also provided a central circular hub cap simulating portion formed preferably from relatively rigid sheet material such as sheet metal or the like, said central portion having resilient fingers for detachably engaging onto a flange at the wheel openings to retain the same upon the wheel structure and also having a radially outwardly extending intermediate circular part to provide a circular hump over which the radially inner margin of the outer cover member may extend to be retained thereby upon the wheel structure.

Other objects and advantages of the invention will become apparent from the following description and accompanying drawings in which:

Figure 1 is a fragmentary side elevational view of a wheel structure embodying one form of my invention;

Figure 2 is a fragmentary enlarged cross-sectional view of a wheel structure embodying the form of invention shown in Figure 1; and Figure 3 is an enlarged, fragmentary radial cross-sectional view of a wheel structure embodying another form of my invention.

It will be understood that the embodiments shown herein are for illustrative purposes only and may be changed or modified without departing from the spirit and scope of the invention as set forth in the appended claim.

In the form of the invention shown in Figures 1 and 2 the wheel structure includes a tire rim 10 having a base flange 11 and a central load bearing portion 12 having a generally axially inwardly extending peripheral skirt or flange 12a which is depressed at circumferentially spaced parts to provide wheel openings 12b along the junction of the tire rim and the central load bearing portion, these parts being held together by attachment of the radial outward portions of the flange 12a to the base flange 11 by welding or riveting or the like.

The tire rim 10 is further provided with opposite side wall flanges 13, opposite intermediate flanges 14 and opposite edge portions 15, between which may be disposed a pneumatic tire 16 having an inner tube 17.

The cover assembly in the construction of Figure 2 includes an outer annular part 18 preferably formed from sheet synthetic plastic material or the like, whereby it possesses characteristics enabling it to be locally, temporarily flexed and yet whereby it is self-sustaining as to form and will immediately snap back to the configuration shown when distorting pressures are relieved therefrom. The cover assembly is completed by the provision of a central circular hub cap simulating portion 19 which is preferably constructed from a more rigid material such as sheet metal or the like.

The radially outer annular cover member 18 is formed with a cross-sectional configuration of such magnitude that it extends radially outwardly beyond the edge portion 15 of the tire rim 10 as at 20, whereby the radially outer edge extends into adjacency with the side wall of the tire 16, this radially outer edge being preferably curved slightly outwardly to present a smooth surface to the tire as shown at 21. The cover member 18 extends radially inwardly a sufficient distance so that it extends beyond the junction of the tire rim 10 and the central load bearing portion 12 and is anchored in a manner to be presently described.

As will be seen from Figure 2 the cross-sectional shape of the cover member 18 is such that it generally simulates the shape of the side wall of the tire 16 thus to give the appearance of being a continuation thereof and to appear as a white side wall of a massive tire when colored white. This feature of the cover member 18 is important in that in the past it has been found that the molding of a white side wall into a tire is an expensive operation whereas with the present invention an ordinary tire may be utilized and deterioration thereof does not also involve deterioration of the white side wall.

The central circular hub cap simulating cover member 19 is provided with a central crowned portion 22 which is so formed cross-sectionally as to provide at the radially outer part thereof a circular, axially inwardly extending rib 23 and a circular, axially outwardly, generally radially outwardly extending rib 24, the latter terminating in generally axially inwardly extending resilient fingers 25 which are provided with radially inwardly facing humps 26 near the axially inner ends thereof.

With such a construction it will be seen that the cover member 18 may be aligned concentrically with the cover member 19 and slid axially outwardly over the fingers 25 thereof until the radially inner margin of the cover member 18, having the peripheral bead 27 thereon for reinforcing the same, may come to rest against the axially inner shoulder formed by the bead 24 of the cover member 19. After the cover members 18 and 19 are disposed in the above described position, the assembly thus formed may be pressed axially inwardly against the wheel structure with the fingers 25 aligned with the respective wheel openings, whereupon the fingers are deflected radially outwardly as they pass over the adjacent portions of the flange 12a of the central load bearing portion 12 until the humps 26 thereof extend over the axially inner edges of the respective portions of the flange 12a. When the fingers 25 are in this position it will be seen that the cover assembly is securely, detachably retained upon the wheel structure and that the bead 23 of the cover member 19 is disposed in surface abutment with the adjacent portion of the outer surface of the central load bearing member 12 of the wheel. Thus it will be seen that the bead 23 acts as a stop member to prevent further inward movement of the cover assembly and that the bead 27 of the cover member 18 now comes to rest against the radially outwardly extending portions of the body part 12, while the bead 24 of the cover member 19 serves to hold the cover 18 in place and also to rigidify and reinforce the entire assembly particularly at the junction of the cover parts.

With the foregoing construction it will be seen that in order to remove the cover assembly from the wheel the operator need merely flex the radially outer part of the cover member 18 laterally outwardly and insert the point of a pry-off tool between two of the resilient fingers 25. Thereafter when the pry-off tool is raised outwardly at the outer part thereof it will be seen that the point will draw the respective fingers 25 outwardly over the engaged portion of the flange 12a to release the cover assembly from the wheel.

In the construction of Figure 3 the wheel assembly is similar to that described in conjunction with Figure 2 and similar parts are similarly identified.

In the construction of Figure 3 the cover assembly includes an outer annular cover member 28 having attributes similar to those described in conjunction with the cover member 18 of Figure 2 and a central circular hub cap simulating cover member 29 having a central crowned portion 30 terminating radially outwardly in a generally radially outwardly extending bead 31 that comprises the axially outer side of a radially inwardly grooved portion 32 which in turn terminates in generally axially inwardly extending resilient fingers 33. The fingers 33, as will be seen clearly from Figure 3, are provided at the outer ends thereof with radially inwardly extending humps 34 which serve a purpose similar to that described in conjunction with the humps 26 in the construction of Figure 2.

As in the construction of Figure 2, the cover member 28 of Figure 3 may be mounted on the cover member 29 by axial outward movement of the same over the fingers 33 until the radially inner bead 35 of the cover member 28 comes to rest in the groove 32 of the cover member 29. Thus it will be seen that the cover members of Figure 3 may be formed into a unitary assembly which may be handled as a single cover during attachment to and removal from the wheel structure.

In the constructions of Figures 2 and 3 it will be seen that the radially inner edges of the cover members 18 and 28 respectively, namely the beads 27 and 35 respectively, are so associated with the cover that lateral outward flexure of the radially outer part of the annular cover members in each case is accompanied by free radial action of the radially inner portions of the covers, thereby to provide for equal distribution of bending stresses and strains over the entire annular cover members rather than over a localized portion thereof under which latter conditions the cover would be subjected to fatigue and would break. This is particularly true when it is considered that the covers extend into adjaceny with the side wall of the tire and thus are subjected to repeated and rapid lateral flexure due to lateral expansion of the tire under load bearing conditions as it reaches the bottom position on the wheel against the surface over which the vehicle is traversed.

In the construction of Figure 3 it will be seen that the grooved portion 32 serves as the stop member for preventing axial inward movement to too great a degree while the radially outwardly extending bead 31 serves admirably as a pry-off anchorage for the point of a pry-off tool in removing the cover from the wheel structure by withdrawal of the resilient fingers 33 over the respective portions of the flange 12a.

From the foregoing it will be seen that in each of the embodiments disclosed herein there is provided an outer annular cover member formed from sheet synthetic plastic material or the like and extending radially outwardly beyond the edge portion of a tire rim to simulate the configuration of the side wall of the tire and to give an appearance of being a continuation thereof and the white side wall of a tire when colored white. There is also provided in each of the embodiments a central circular hub cap simulating cover portion preferably formed from a more rigid material such as sheet metal or the like, each central cover portion having a generally axially extending retaining part for retainingly engaging a portion of the wheel structure and for aligning the cover assembly therewith, each having an abutment portion arranged to abuttingly engage an adjacent portion of the axially outer surface of the wheel structure to delimit the axially inward movement of the cover assembly during an attaching operation and each having an intermediate, circular, reinforcing rib for receiving the radially inner part of the outer cover member.

What I claim is:

In a cover structure for a wheel including a multi-flanged tire rim part and a body part having wheel openings therein, an annular cover member for disposition over flanges of said rim part and made of resiliently reflectable form-sustaining plastic material, a central cover member disposed opposite the body part and including a crown portion and an axially rearwardly turned peripheral portion extending behind the crown portion to define a shoulder engaged by the inner edge portion of the annular cover member and seating edgewise upon the body part at the radially inward side of the wheel openings, and rearwardly projecting spaced resilient fingers extending from said edge for snap-on engagement with said body part in said wheel openings, said annular cover member resting at its inner edge on the body part beside the edge of said rearwardly turned peripheral shoulder portion and bearing against the shoulder at the juncture of said resilient fingers and said edge of the rearwardly turned peripheral portion.

GEORGE ALBERT LYON.

REFERENCES CITED

The following references are of record in the file of this patent:

UNITED STATES PATENTS

| Number | Name | Date |
| --- | --- | --- |
| 2,212,037 | Lyon | Aug. 20, 1940 |
| 1,234,387 | Pugh | July 24, 1917 |
| 2,158,125 | Horn | May 16, 1939 |
| 2,298,669 | Wood | Oct. 13, 1942 |
| 2,190,669 | Lyon | Feb. 20, 1940 |
| 2,279,331 | Lyon | Apr. 14, 1942 |
| 2,368,243 | Lyon | Jan. 30, 1945 |

FOREIGN PATENTS

| Number | Country | Date |
| --- | --- | --- |
| 281,869 | Great Britain | Dec. 15, 1927 |
| 436,544 | Great Britain | Oct. 14, 1935 |